United States Patent
Kamay et al.

(10) Patent No.: US 9,025,898 B2
(45) Date of Patent: May 5, 2015

(54) DYNAMICALLY SELECTING COMPRESSION METHOD FOR GRAPHICS REMOTING

(75) Inventors: Yaniv Kamay, Modi' (IL); Yonit Tova Halperin, Herzelia (IL)

(73) Assignee: Red Hat Israel, Ltd., Raanana (IL)

( * ) Notice: Subject to any disclaimer, the term of this patent is extended or adjusted under 35 U.S.C. 154(b) by 1211 days.

(21) Appl. No.: 12/419,238

(22) Filed: Apr. 6, 2009

(65) Prior Publication Data
US 2010/0254622 A1 Oct. 7, 2010

(51) Int. Cl.
| | | |
|---|---|---|
| G06K 9/36 | (2006.01) | |
| H04N 21/234 | (2011.01) | |
| H04N 21/2343 | (2011.01) | |
| H04N 21/81 | (2011.01) | |
| H04N 19/115 | (2014.01) | |
| H04N 19/12 | (2014.01) | |
| H04N 19/136 | (2014.01) | |
| H04N 19/27 | (2014.01) | |

(52) U.S. Cl.
CPC ..... *H04N 21/23418* (2013.01); *H04N 21/2343* (2013.01); *H04N 21/8146* (2013.01); *H04N 19/115* (2014.11); *H04N 19/12* (2014.11); *H04N 19/136* (2014.11); *H04N 19/27* (2014.11)

(58) Field of Classification Search
CPC .......... H04N 19/0006; H04N 19/0078; H04N 19/00139; H04N 19/00412; H04N 21/23418; H04N 21/2343; H04N 21/8146; H04N 1/644; H04N 19/00127; H04N 19/00309; H04N 19/00315; H04N 19/00545; H04N 19/115; H04N 19/12; H04N 19/136; H04N 19/27

USPC ......... 382/170, 173, 274, 254, 224, 164, 239, 382/244, 248, 232; 358/474, 539, 426.03, 358/426.07
See application file for complete search history.

(56) References Cited

U.S. PATENT DOCUMENTS

| | | | | |
|---|---|---|---|---|
| 6,154,569 | A * | 11/2000 | Sakaue et al. | 382/233 |
| 6,208,351 | B1 * | 3/2001 | Borg et al. | 345/600 |
| 6,400,830 | B1 * | 6/2002 | Christian et al. | 382/103 |
| 6,480,624 | B1 * | 11/2002 | Horie et al. | 382/165 |
| 6,996,260 | B1 * | 2/2006 | Skands et al. | 382/128 |
| 7,139,433 | B2 * | 11/2006 | Li | 382/232 |
| 7,420,590 | B2 * | 9/2008 | Matusik et al. | 348/159 |

(Continued)

OTHER PUBLICATIONS

Lin et al., Compound Image Compression for Real-Time Computer Screen Image Transmission, Published 2005, IEEE, pp. 993-1005.*

(Continued)

*Primary Examiner* — Mekonen Bekele
(74) *Attorney, Agent, or Firm* — Lowenstein Sandler LLP

(57) ABSTRACT

Method and apparatus for improving compression efficiency of for graphics remoting are described herein. According to one embodiment, for each data object of a stream generated within a virtual machine, the data object including graphics data representing an image to be rendered at a client over a network, it is determined whether an image associated with each data object is related to a real life content or an artificial content based on a similarity of one or more pixels selected within at least a segment of the image. A compression method is selected based on the determination of whether the image is related to a real life content or an artificial content. The image is compressed using the selected compression method and thereafter, the compressed image is streamed to the client over the network to be rendered at the client. Other methods and apparatuses are also described.

19 Claims, 7 Drawing Sheets

(56) References Cited

U.S. PATENT DOCUMENTS

| | | | |
|---|---|---|---|
| 7,599,555 B2 * | 10/2009 | McGuire et al. | 382/173 |
| 7,602,990 B2 * | 10/2009 | Matusik et al. | 382/260 |
| 7,633,511 B2 * | 12/2009 | Shum et al. | 345/628 |
| 7,636,128 B2 * | 12/2009 | Sun et al. | 348/586 |
| 7,636,496 B2 * | 12/2009 | Duan et al. | 382/274 |
| 7,643,182 B2 * | 1/2010 | Glickman | 358/474 |
| 7,936,929 B2 * | 5/2011 | Dai et al. | 382/225 |
| 2001/0016065 A1 * | 8/2001 | Yamamoto et al. | 382/173 |
| 2004/0080533 A1 * | 4/2004 | Nishtala et al. | 345/748 |
| 2004/0146206 A1 * | 7/2004 | Matsubara | 382/232 |
| 2004/0179742 A1 * | 9/2004 | Li | 382/239 |
| 2006/0204086 A1 * | 9/2006 | Gargi | 382/166 |
| 2007/0031051 A1 * | 2/2007 | Lee et al. | 382/239 |
| 2007/0253625 A1 * | 11/2007 | Yi | 382/228 |
| 2007/0269132 A1 * | 11/2007 | Duan et al. | 382/274 |
| 2009/0208106 A1 * | 8/2009 | Dunlop et al. | 382/173 |
| 2010/0142846 A1 * | 6/2010 | Tolliver et al. | 382/274 |
| 2010/0303348 A1 * | 12/2010 | Tolliver et al. | 382/164 |
| 2011/0064308 A1 * | 3/2011 | Stein et al. | 382/170 |
| 2012/0307920 A1 * | 12/2012 | Medard et al. | 375/259 |

OTHER PUBLICATIONS

Maurizo Garbarino (hereafter Garbarino), "Automatic Classification of Natural and Synthetic Images" MS Thesis, published on in 2008, Abstract-Chapter 1, Chapter 2 and chapter 3, 38 pages.*
Takeshi Mogi, "A Hybrid Compression Method based on Region Separation for Synthetic and Natural Compound Images" 1999 IEEE p. 777-781.*
"Solid Ice: Provisioning Manager," Qumranet, Apr. 2008, 5 pages.
"Solid Ice: Virtual Desktop Server (VDS)," Qumranet, Apr. 2008, 6 pages.
"Solid Ice: Connection Broker," Qumranet, Apr. 2008, 7 pages.
"Solid Ice: Overview," Qumranet, Apr. 2008, 15 pages.
"KVM—Kernel-based Virtualization Machine," Qumranet, white paper, 2006, 5 pages.

* cited by examiner

FIG. 4

DYNAMICALLY SELECTING COMPRESSION METHOD FOR GRAPHICS REMOTING

TECHNICAL FIELD

The present invention relates generally to graphics remoting. More particularly, this invention relates to dynamic selection of a compression method for graphics remoting.

BACKGROUND

Graphics remoting systems allow computing device network clients to connect to a remote server and receive a visual representation of at least some of the graphics being displayed at or output by the server. Often the network client can display all the graphical output associated with the session. Likewise, the client may be allowed to interact with the session, injecting user input, generated from devices such as a mouse or keyboard connected to the client, into the server session.

In some computing environments, entities also use terminal servers to provide remote access to applications and data. A terminal server is a computer system that maintains applications that can be remotely executed by client computer systems. Input is entered at a client computer system and transferred over a network (e.g., using protocols based on the ITU T.120 family of protocols, such as, for example, Remote Desktop Protocol ("RDP")) to an application at the terminal server. The application processes the input as if the input was entered at the terminal server. The application generates output in response to the received input and the output is transferred over the network (e.g., also T.120 based protocols) to the client computer system. The client computer system presents the output data.

Thus, input is received and output is presented at the client computer system, while processing actually occurs at the terminal server. In most, if not all terminal server environments, input data (entered at a client computer system) typically includes mouse and keyboard data representing commands to an application and output data (generated by an application at the terminal server) typically includes data for display at a display device.

Recently, desktop virtualization or virtual desktop infrastructure has become more popular. Desktop virtualization is a server-centric computing model that borrows from the traditional thin-client model but is designed to give system administrators and end-users the best of the ability to host and centrally manage desktop virtual machines in the data center while giving end users a full PC desktop experience.

Desktop virtualization provides many of the advantages of a terminal server, while providing users with much more flexibility. Each user, for example, might be allowed to install and configure his/her own applications. Users also gain the ability to access their server-based virtual desktop from other locations.

However, there has been a lack of efficient streaming mechanisms and/or data compression mechanisms to improve network traffic and processing efficiency of the client in a desktop virtualization environment.

BRIEF DESCRIPTION OF THE DRAWINGS

The present invention is illustrated by way of example and not limitation in the figures of the accompanying drawings in which like references indicate similar elements.

FIG. 4 is a block diagram illustrating an example of an image at a pixel level.

DETAILED DESCRIPTION

Method and apparatus for improving compression efficiency for graphics remoting are described herein. In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to certain embodiments, graphics data associated with a frame or an image representing a snapshot of an application display output, such as, for example, a desktop application is analyzed to identify a type of content associated with the image, such as, for example, "real life" content vs. "artificial" content. Different data compression methods may be employed to compress different types of content.

For example, certain image compression methods (e.g., entropy-based methods, or dictionary-based methods) can be performed with different performance characteristics based on different types of images. Performance characteristics may include, for example, encoding time, decoding time, and compression ratio, etc. According to one embodiment, when compressing an image or a portion of the image, different compression methods may be dynamically selected dependent upon certain content characteristics of the image. For example, a "real life" image and an "artificial" image may be compressed using different compression methods. An image may be classified as a "real life" image or an "artificial" image based on certain pixel patterns of the image (e.g., at a pixel level) at runtime and an appropriate compression method is dynamically selected for compressing the respective image.

The desktop application, which may run on a guest operating system (OS) in a virtual machine hosted by a server, is accessed by a thin client application (e.g., browser) of a client over a network as if the application were running locally within the client. The compressed data may be streamed to the client using a variety of communication protocols, such as, for example, remote desktop protocol (RDP) available from Microsoft® Corporation of Redmond, Wash. or alternatively, SPICE™ (simple protocol for independent computing environments) protocol available from Qumranet, Inc. of Israel, a subsidiary of Red Hat, Inc. of Raleigh, N.C.

Figure 1:
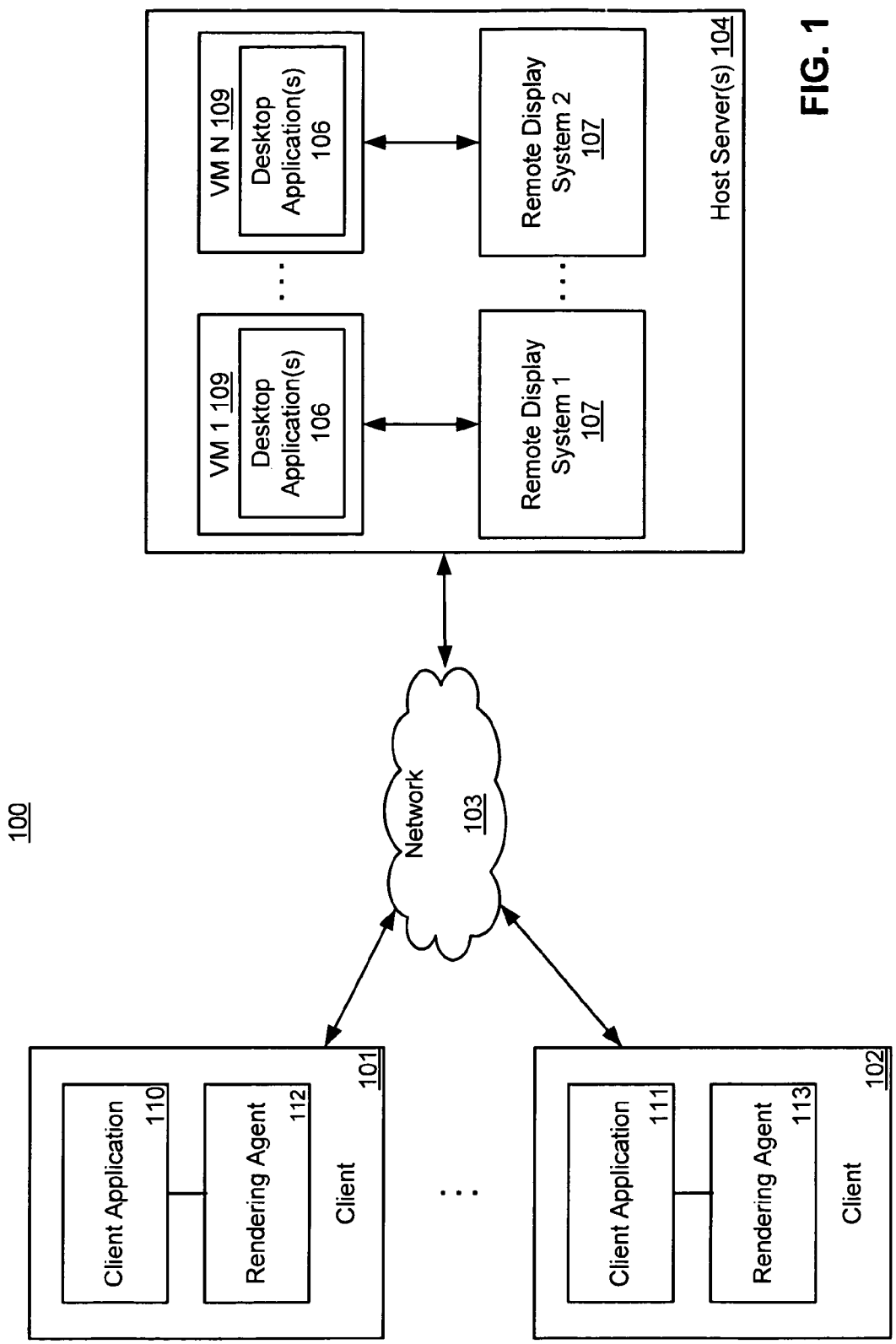
FIG. 1 is a block diagram illustrating an example of a network configuration according to one embodiment of the invention.

FIG. 1 is a block diagram illustrating an example of a network configuration according to one embodiment of the invention. Referring to FIG. 1, network configuration 100 includes, but is not limited to, one or more clients 101-102 communicatively coupled to a remote server or a cluster of servers 104 over a network 103. Network 103 may be a local area network (LAN) or a wide area network (WAN) and may be a combination of one or more networks. Clients 101-102 can be any computer system in communication with server 104 for remote execution of applications at server 104. For example, system 100 may be implemented as part of a graphics remoting system. Generally, a client such as client 101 can be a computer system in communication with server 104 for remote execution of applications at server 104. Thus, input data (e.g., mouse and keyboard input) representing application commands is received at the client and transferred over network 103 to server 104. In response to client side data, an application (e.g., desktop application 106) can generate output display commands (e.g., graphics commands, simply referred to herein as graphics data), which may include one or more paint and/or draw operations, for example, in the form of executable instructions. The output display commands can then be transmitted (e.g., as graphics update commands) with optional compression back to the remote client and a remote display driver (e.g., rendering agent 112) of the remote client can collect the graphics commands and generate corresponding drawing commands for rendering at a display device of the client. Note that a desktop application is utilized herein as an example; however, any other application may also be applied.

In one embodiment, server 104 is configured to host one or more virtual machines 109, each having one or more desktop applications 106 (e.g., desktop operating system). Desktop application 106 may be executed and hosted by an operating environment (e.g. an operating system) within virtual machine 109. Such an operating system in virtual machine 109 is also referred to as a guest operating system. Multiple guest operating systems and the associated virtual machines may be controlled by another operating system (also referred to as a host OS). Typically, a host OS represents a virtual machine monitor (VMM) (also referred to as a hypervisor) for managing the hosted virtual machines. A guest OS may be of the same or different type with respect to the host OS. For example, a guest OS may be a Windows™ operating system from Microsoft and a host OS may be a Linux operating system available from Red Hat.

Virtual machine 109 can be any type of virtual machines, such as, for example, hardware emulation, full virtualization, para-virtualization, and operating system-level virtualization virtual machines. Different virtual machines hosted by server 104 may have the same or different privilege levels for accessing different resources.

In one embodiment, server 104, also referred to as a virtual desktop server (VDS), hosts multiple virtual machines (e.g., virtual machine 109), each hosting or maintaining a desktop environment remotely accessed by a client such as clients 101-102, in this example, desktop application 106. For the purpose of illustration, desktop 106 represents an output (e.g., a snapshot of an image to be displayed) generated by a desktop application running within virtual machine 109. Graphics data associated with desktop 106 is then streamed to a client such as clients 101-102, where the desktop 106 may be rendered by a rendering agent (e.g., agents 112-113) and presented by a client application (e.g., applications 110-111) respectively.

In one embodiment, the server 104 hosts a remote display system 107 for each virtual machine 109 that is responsible for transferring graphics data associated with desktop 106 to clients 101-102. In particular, prior to streaming graphics data of desktop 106 to, in this example, client 101, remote display system 107 compresses an image of desktop 106 using a variety of data compression methods 108 dependent upon certain characteristics of the image.

For example, content of an image may be classified as "real life" content or "artificial" content based on certain pixel patterns of the image (e.g., similarity of the pixels). An image is classified as a "real life" image when the neighboring pixels tend to be similar (but not identical) from an "artificial" image in which neighboring pixels can be very distant. For example, in a text image, foreground and background usually differ significantly. Based on the classification, an appropriate compression method is selected for compressing the respective image. Such a classification may be performed at run time and a compression method may be selected dynamically.

The compressed image is then streamed to client 101 over network 103 using a variety of communications protocols, such as, for example, RDP protocol or a proprietary protocol such as SPICE™ protocol from Qumranet.

When rendering agent 112 receives the compressed data, agent 112 identifies the corresponding decompression methods and uses the identified decompression methods to decompress the received data and to render the desktop image to be presented at client application 110. Client application 110 may be a thin client application such as a browser application. Note that throughout this application and for the purposes of illustration only, data to be transmitted from a server to a client represents a snapshot of a virtual desktop image. Typically, the data being transmitted includes graphics commands (e.g., paint and/or draw commands) as well as other information (e.g., location and/or shape, etc.) such that the client can execute or render the graphics commands to construct the associated virtual desktop image.

System 100 may be implemented as part of a server or a cluster of servers within a data center of an enterprise entity. It allows enterprises the benefit of centralized desktops without the need to change their applications or infrastructure. Enterprises benefit from an improvement in the manageability, security and policy enforcement for their desktop environment, and consequently, realize a significant reduction in the desktop TCO (total cost of ownership).

In one particular embodiment, the server 104 is configured to run the virtualization platform/hypervisor and the virtual desktops. SPICE™ communication protocol is utilized to communicate between a client and a server. SPICE™ is a remote rendering technology developed specifically for virtual desktops that allow users to "see" their desktops and interact with them. In this embodiment, a user's desktop runs inside a kernel-based virtual machine (KVM) on VDS 104 in the enterprise data center. The user then accesses his/her desktop from a thin client (e.g., client application 110) using SPICE™ protocol. System 100 may be implemented as part of Solid ICE™ (independent computing environment) virtualization solution available from Qumranet. Note that an application related to a virtual desktop is utilized herein as an example throughout this application for illustration purposes only. However, techniques described herein can also be applied to any kinds of graphics remoting applications.

Figure 2:
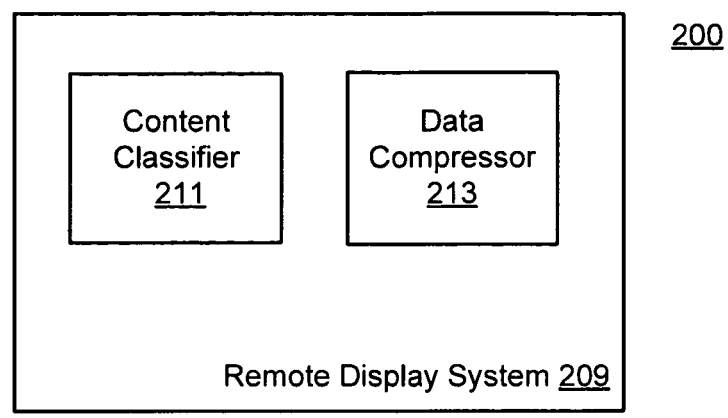
FIG. 2 is a block diagram illustrating an example of a remote display system according to one embodiment of the invention.

FIG. 2 is a block diagram illustrating an example of a remote display system 209 according to one embodiment of the invention. When a client's desktop application is executed within an associated virtual machine, the remote display system 209 is configured to capture a display output (e.g., graphics data) of the desktop application (e.g., a desktop image).

The remote display system may include a content classifier 211 and a data compressor 213. According to one embodiment, an image with certain types of content (e.g., relatively static content) may be classified (e.g., by content classifiers 211-212) to determine whether the image is related to "real life" content or "artificial" content. In general, pixel values associated with the "real life" content tend to change relatively "smoothly" among the pixels while pixel values associated with the "artificial" content tend to change relatively "sharply" among the pixels. By determining similarity of the pixels of an image, a content classifier can determine whether the image is more like a "real life" or "artificial" type of image. A compression method is selected that is most appropriate for the determined type of image and thereafter, the image is compressed using the determined compression method.

Thus, different compression methods (e.g., Huffman, JPEG, and LZ77 compression algorithms) may be employed dependent upon whether the corresponding content of the image contains "real life" or "artificial" content. Note that the data compressor and/or content classifier may also be implemented as separate modules communicatively coupled to the virtual display driver.

Figure 3:
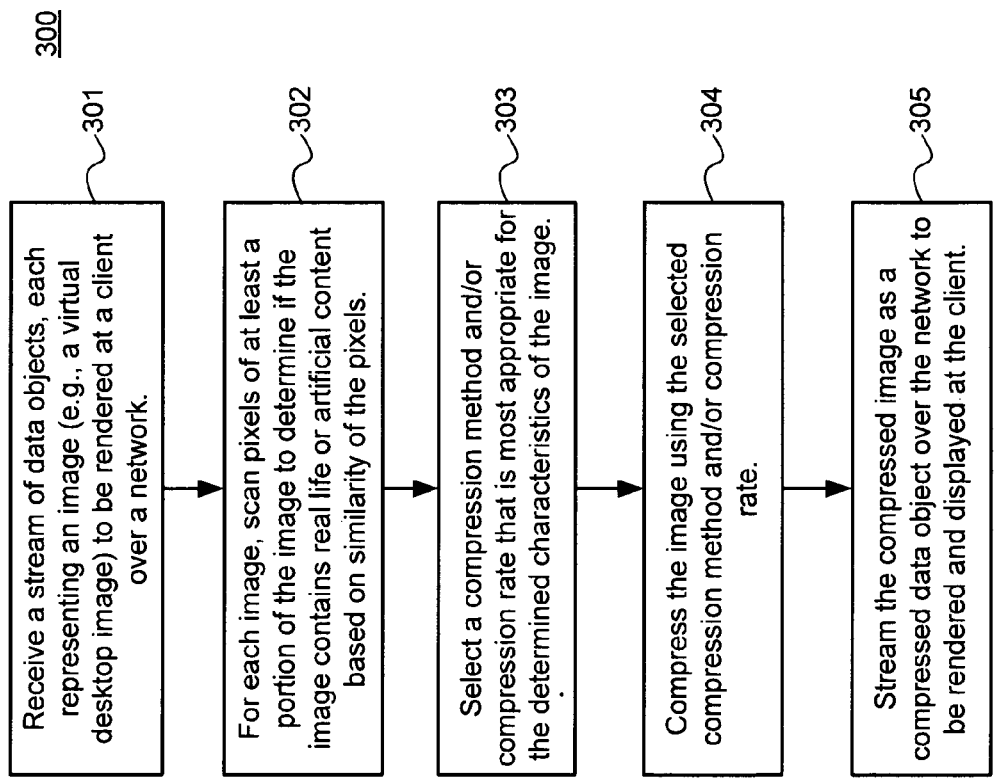
FIG. 3 is a flow diagram illustrating a method for compressing virtual desktop images according to one embodiment of the invention.

FIG. 3 is a flow diagram illustrating a method for compressing virtual desktop images according to one embodiment of the invention. Note that method 300 may be performed by processing logic which may include software, hardware, or a combination of both. For example, method 300 may be performed by system 200 of FIG. 2. At block 301, a stream of data objects is received where each data object represents a virtual desktop image to be transmitted and rendered at a client. In one embodiment, the data objects are generated from a desktop application (e.g., desktop operating system), for example, running within a virtual machine, which may be implemented in one of the virtual machine environments described above.

For each data object, at block 302, processing logic scans at least a portion of pixels of the associated virtual desktop image to determine whether the image contains "real life" or "artificial" type of content based on similarity of the pixels. At block 303, an appropriate compression method (e.g., Huffman, JPEG, or LZ77) is selected based on the determined type of content. At block 304, the image or the at least a portion of the image is compressed using the selected compression method and thereafter, at block 305, the compressed data is streamed to the client over the network.

According to certain embodiments, in order to determine whether a particular image or a portion of the image contains "real life" or "artificial" type of content, certain pixels (e.g., samples) are selected to be evaluated with respect to their respective neighboring pixels to determine a similarity between a selected pixel and its neighboring pixels. A score is calculated for each selected pixel based on the determined similarity. Thereafter, an average score for some or all selected pixels within the image or segment of the image is calculated. If the average score satisfies a predetermined category (e.g., predetermined threshold), a particular compression method is selected; otherwise, another compression method is selected. That is, based on the type of content associated with an image, a compression method that is better suited is utilized for compressing the image. For example, dictionary based compression methods or statistical compression methods may perform better on the "artificial" images than pixel-predicting methods such as JPEG-LS, because the "artificial" images tend to contain repetitive content. Note that although the entire image is analyzed as a whole, only samples of pixels may be selected for the analysis.

The general idea is to distinguish images in which neighboring pixels tend to be similar (but not identical) from images in which neighboring pixels can be very distant. The former is characterized as "real life" images, while the latter is characterized as "artificial images. For example, in a text image, foreground and background usually differ significantly. Given an RGB image, according to one embodiment, a fraction of the pixels are sampled. Each such pixel is assigned with a score according to its color proximity to colors of its surrounding pixels. Identical adjacent pixels are ignored since most compression methods can handle this situation well enough. An average score of all sampled pixels are calculated and based on the average score (with respect to a predetermined threshold), a compression method is selected for compressing the respective image.

Figure 4:
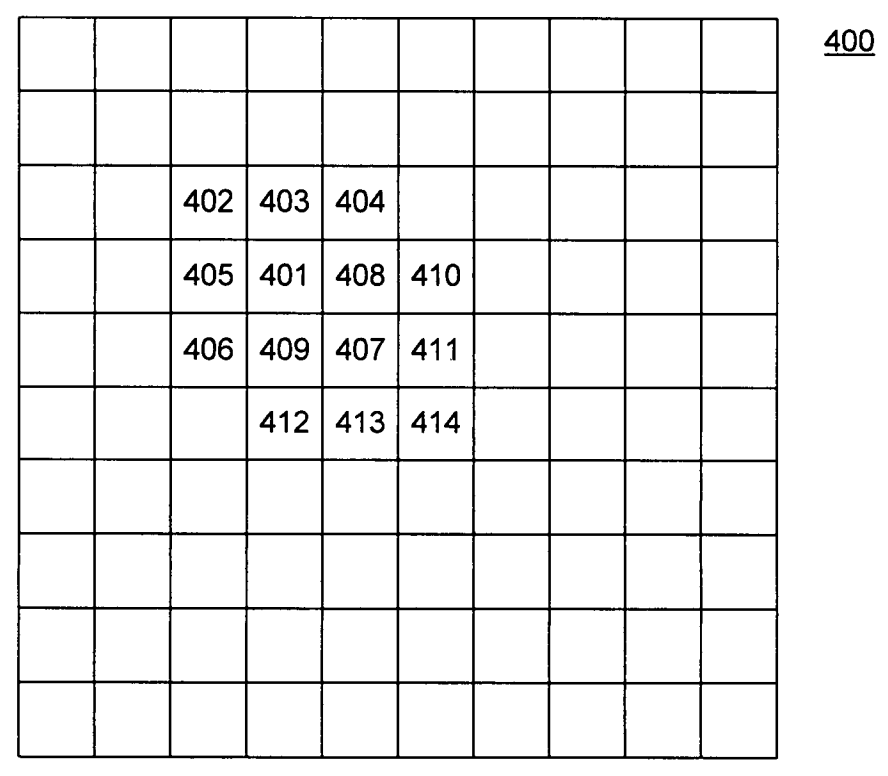

For example, as shown in FIG. 4, image 400 represents an image or a segment of the image (e.g., sample segment) having multiple pixels therein. As described above, for each pixel, similarity between the respective pixel and one or more of its neighboring pixels is determined. Referring to FIG. 4, for example, for pixel 401, similarity between pixel 401 and one or more of its neighboring pixels 402-409 is determined. In one embodiment, a score is assigned based on a relationship between pixel 401 and one or more of its neighboring pixels 402-409. A score may be assigned based on certain categories representing a similarity between pixel 401 and a neighboring pixel. For example, a score of zero may be assigned if pixel 401 and a neighboring pixel are identical (e.g., having identical pixel value). A score of a negative value may be assigned if pixel 401 and a neighboring pixel are similar (e.g., the difference between pixel values is below a predetermined threshold). A score of a positive value may be assigned if pixel 401 and a neighboring pixel are different (e.g., the difference between pixel values is above a predetermined threshold).

Similarly, for pixel 407, a final score is calculated using the above techniques with respect to one or more of its neighboring pixels 408-414. Thereafter, an average score for all pixels in image 400 is calculated. If the average score for image 400 is below a predetermined threshold, image 400 may be considered a "real life" image; otherwise, image 400 may be considered an "artificial" image. That is, if the average score is above a predetermined threshold, a lossless algorithm is selected that is more efficient for an "artificial" image; otherwise, an algorithm is selected that is more efficient for a "real life" image. In one embodiment, a "real life" image is compressed using a JPEG (e.g., JPEG-2000) compatible compression method while an "artificial image is compressed using a statistical or dictionary based compression method (e.g., Lempel-Ziv algorithm).

Note that the above operations are performed in runtime and the compression method is selected dynamically. Also note that for each image, only samples of pixels may be scanned to determine whether the image contains "real life "content or "artificial content".

Figure 5:
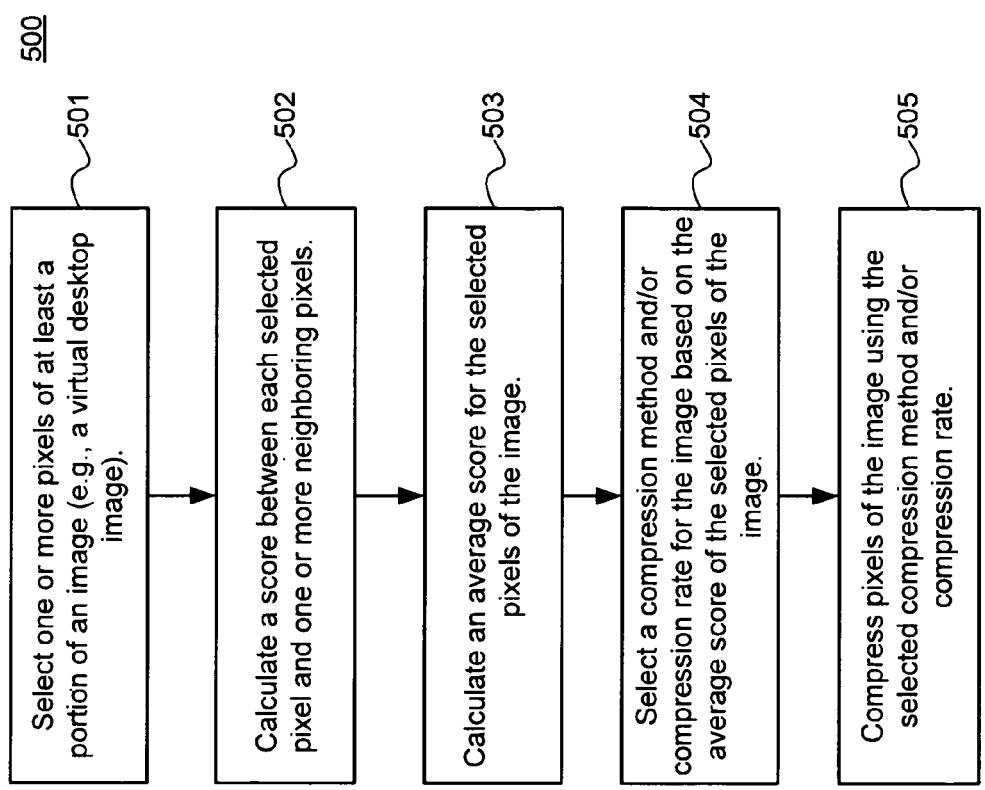
FIG. 5 is a flow diagram illustrating a method for compressing a virtual desktop image according to one embodiment of the invention.

FIG. 5 is a flow diagram illustrating a method for compressing a virtual desktop image according to one embodiment of the invention. Note that method 500 may be performed by processing logic which may include software, hardware, or a combination of both. For example, method 500 may be performed system 200 of FIG. 2. Referring to FIG. 5, at block 501, one or more pixels of at least a portion of an image (e.g., a virtual desktop image) are selected. At block 502, a score is calculated for each selected and one or more of its surrounding pixels, using the techniques set forth above. At block 503, an average score for the selected pixels is calculated. At block 504, a compression method and/or compression rate are selected for the image based on the average score and at block 505, the image is compressed using the selected compression method and/or compression rate.

Figure 6:
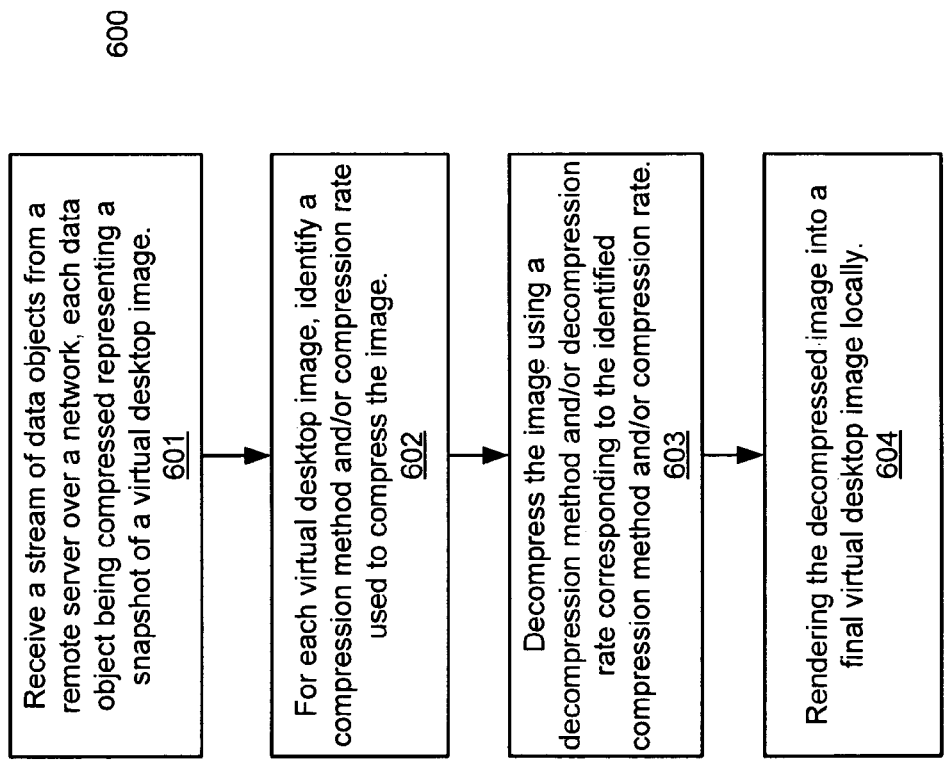
FIG. 6 is a flow diagram illustrating an example of a method for rendering a virtual desktop according to one embodiment of the invention.

FIG. 6 is a flow diagram illustrating an example of a method for rendering a virtual desktop according to another embodiment of the invention. Note that method 600 may be performed by processing logic which may include software, hardware, or a combination of both. For example, method 600 may be performed by any of rendering agents 112-113 of clients 101-102 of FIG. 1. Referring to FIG. 6, at block 601, a stream of data objects is received from a remote server over a network. Each data object represents a snapshot of a virtual desktop image which is generated and compressed within a virtual machine of the remote server. At block 602, for each data object, processing logic identifies a compression method and/or compression rate used to compress the data object, which may be transmitted within the data stream (e.g., metadata). At block 603, processing logic decompresses the data object using a decompression method corresponding to the identified compression method. At block 604, the decompressed data object is then rendered into a virtual desktop image representing a local desktop but executed from the remote server.

Figure 7:
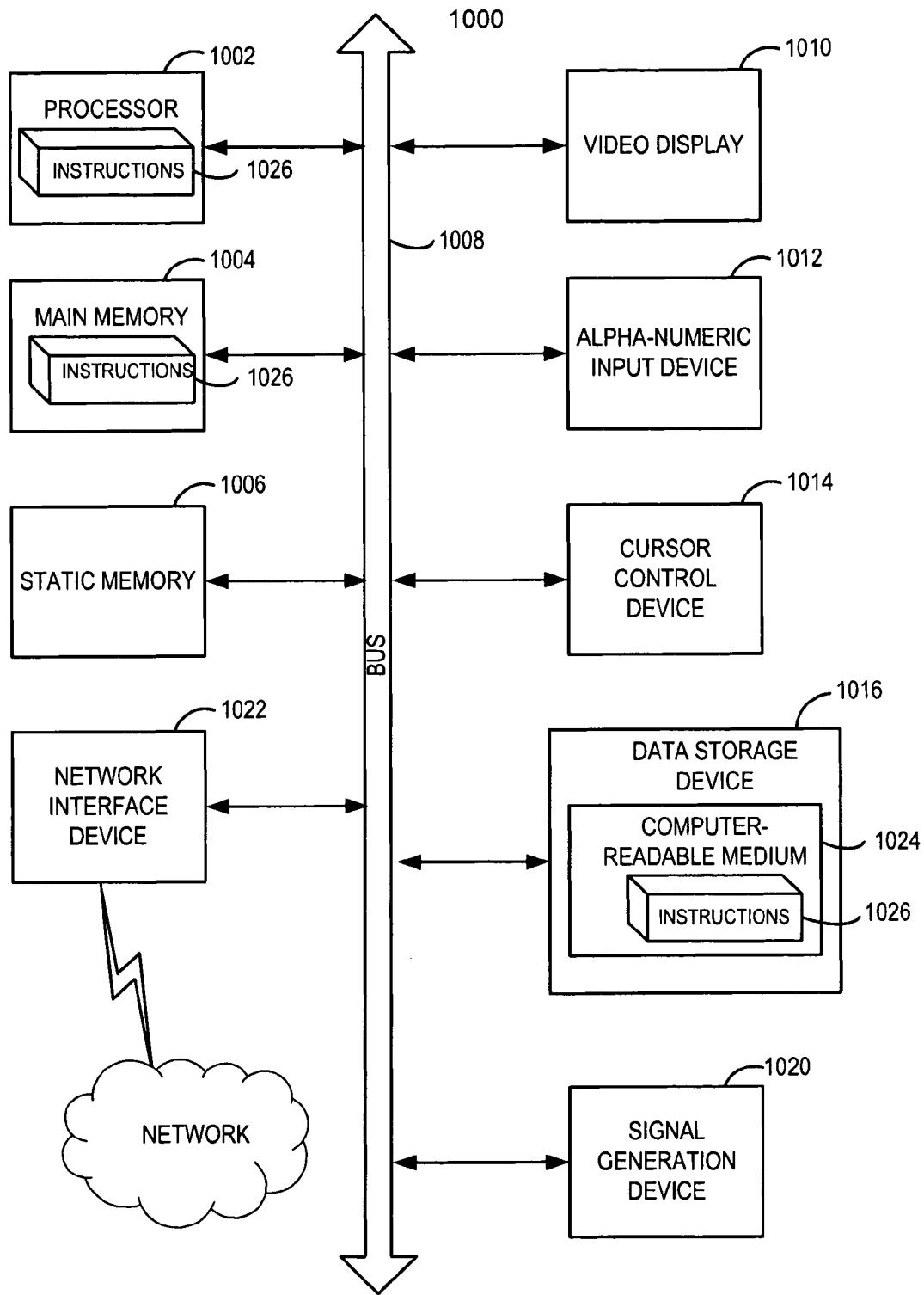
FIG. 7 is a block diagram illustrating an example of a data processing system which may be used with an embodiment of the invention.

FIG. 7 is a block diagram illustrating a data processing system which may be used with an embodiment of the invention. For example, system 1000 may be implemented as part of a client and/or a server described above. System 1000 illustrates a diagrammatic representation of a machine in the exemplary form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes a processing device (processor) 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage device 1016, which communicate with each other via a bus 1008.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1002 may also be one or more special-purpose processing devices such as an application specific integrated circuit (ASIC), a field programmable gate array (FPGA), a digital signal processor (DSP), network processor, or the like. The processor 1002 is configured to execute the instructions 1026 for performing the operations and steps discussed herein.

The computer system 1000 may further include a network interface device 1022. The computer system 1000 also may include a display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

The data storage device 1018 may include a machine-accessible storage medium 1024 on which is stored one or more sets of instructions 1026 (e.g., software) embodying any one or more of the methodologies or functions described herein. The software may also reside, completely or at least partially, within the main memory 1004 and/or within the processor 1002 during execution thereof by the computer system 1000, the main memory 1004 and the processor 1002 also constituting machine-accessible storage media. The software may further be transmitted or received over a network via the network interface device 1022.

Thus, method and apparatus for improving compression efficiency for graphics remoting have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A computer-implemented method, comprising:
   for an image associated with each data object of a stream, determining, by a processing device, an average pixel similarity score of the image, wherein determining the average pixel similarity score of the image comprises assigning one of a plurality of similarity scores to each pixel of at least a segment of the image based on a similarity between the pixel and one or more neighboring pixels, the plurality of similarity scores comprising a first score to be assigned when the pixel and the one or more neighboring pixels are identical, a second score to be assigned when the pixel and the one or more neighboring pixels are similar, and a third score to be assigned when the pixel and the one or more neighboring pixels are different;
   comparing the average pixel similarity score of the image with a threshold, wherein the comparing of the average pixel similarity score with the threshold indicates whether the image as a whole is related to the real life content or the artificial content;
   selecting a compression method for the image based on a determination as to whether the image is related to the real life content or the artificial content;
   compressing the image using the selected compression method; and
   sending the image compressed using the selected compression method to a client device over a network.

2. The method of claim 1, wherein the compressed image is streamed to be rendered at the client device.

3. The method of claim 1, wherein the data object includes graphics data representing the image to be rendered at the client device over a network.

4. The method of claim 1, further comprising:
   for each selected pixel, assigning an individual score to one or more adjacent pixels based on a difference between pixel values of a current pixel and the one or more adjacent pixels; and
   calculating a final score for the current pixel based on individual scores of the one or more adjacent pixels of the current pixel.

5. The method of claim 4, further comprising:
   assigning a first score having a zero value if a value of the current pixel and a value of an adjacent pixel are identical;
   assigning a second score having a predetermined positive value if the difference between the value of the current pixel and the value of the adjacent pixel exceeds a predetermined threshold; and
   assigning a third score having a predetermined negative value if the difference between the value of the current pixel and the value of the adjacent pixel is below the predetermined threshold.

6. The method of claim 1, further comprising:
   selecting a first compression method for compressing the image if the average score is below the threshold; and
   selecting a second compression method for compressing the image if the average score exceeds the threshold, the second compression method being different than the first compression method.

7. The method of claim 1, wherein the image is one of virtual desktop images in the stream to be rendered at the client as part of a virtual desktop environment, wherein the stream of virtual desktop images is generated from a desktop application executed within a virtual machine (VM) and accessed remotely by the client over the network.

8. The method of claim 7, wherein the desktop application is executed within a guest operating system (OS) within the VM, and wherein the guest OS is managed by a host OS which virtualizes underlying hardware to the guest OS.

9. The method of claim 8, wherein the guest OS is running as a process in a user space of the host OS, wherein the host OS comprises a kernel module running within a kernel space of the host OS which enables the host OS to manage the VM, and wherein the guest OS comprises a hardware emulator for emulating the underlying hardware which is exposed by the kernel module.

10. A non-transitory computer readable storage medium including instructions that, when executed by a processing device, cause the processing device to perform a method comprising:
   for an image associated with each data object of a stream, determining, by the processing device, an average pixel similarity score of the image, wherein determining the average pixel similarity score of the image comprises assigning one of a plurality of similarity scores to each pixel of at least a segment of the image based on a similarity between the pixel and one or more neighboring pixels, the plurality of similarity scores comprising a first score to be assigned when the pixel and the one or more neighboring pixels are identical, a second score to be assigned when the pixel and the one or more neighboring pixels are similar, and a third score to be assigned when the pixel and the one or more neighboring pixels are different;
   comparing the average pixel similarity score of the image with a threshold, wherein the comparing of the average pixel similarity score with the threshold indicates whether the image as a whole is related to the real life content or the artificial content;

selecting a compression method for the image based on a determination as to whether the image is related to the real life content or the artificial content;

compressing the image using the selected compression method; and streaming the image compressed using the selected compression method to a client device over a network.

11. The non-transitory computer readable storage medium of claim 10, wherein the compressed image is streamed to be rendered at the client device.

12. The non-transitory computer readable storage medium of claim 10, wherein the method further comprises:

for each selected pixel, assigning an individual score to one or more adjacent pixels based on a difference between pixel values of a current pixel and the one or more adjacent pixels; and calculating a final score for the current pixel based on individual scores of the one or more adjacent pixels of the current pixel.

13. The non-transitory computer readable storage medium of claim 12, wherein the method further comprises:

assigning a first score having a zero value if a value of the current pixel and a value of an adjacent pixel are identical;

assigning a second score having a predetermined positive value if the difference between the value of the current pixel and the value of the adjacent pixel exceeds a predetermined threshold; and assigning a third score having a predetermined negative value if the difference between the value of the current pixel and the value of the adjacent pixel is below the predetermined threshold.

14. The non-transitory computer readable storage medium of claim 10, wherein the method further comprises:

selecting a first compression method for compressing the image if the average score is below the threshold; and selecting a second compression method for compressing the image if the average score exceeds the threshold, the second compression method being different than the first compression method.

15. A system comprising:

a memory; and a processing device, coupled to the memory, to:

for an image associated with each data object of a stream, determine an average pixel similarity score of the image, wherein determining the average pixel similarity score of the image comprises assigning one of a plurality of similarity scores to each pixel of at least a segment of the image based on a similarity between the pixel and one or more neighboring pixels, the plurality of similarity scores comprising a first score to be assigned when the pixel and the one or more neighboring pixels are identical, a second score to be assigned when the pixel and the one or more neighboring pixels are similar, and a third score to be assigned when the pixel and the one or more neighboring pixels are different;

compare the average pixel similarity score of the image with a threshold, wherein the comparing of the average pixel similarity score with the threshold indicates whether the image as a whole is related to the real life content or the artificial content;

select a compression method for the image based on a determination as to whether the image is related to the real life content or the artificial content;

compressing the image using the selected compression method; and sending the image compressed using the selected compression method to a client device over a network.

16. The system of claim 15, wherein the compressed image is streamed to be rendered at the client device.

17. The system of claim 15, wherein the data object includes graphics data representing the image to be rendered at the client device over a network.

18. The system of claim 15, wherein the processing device is further to:

for each selected pixel, assign an individual score to one or more adjacent pixels based on a difference between pixel values of a current pixel and the one or more adjacent pixels; and calculate a final score for the current pixel based on individual scores of the one or more adjacent pixels of the current pixel.

19. The system of claim 18, wherein the processing device is further to:

assign a first score having a zero value if a value of the current pixel and a value of an adjacent pixel are identical;

assign a second score having a predetermined positive value if the difference between the value of the current pixel and the value of the adjacent pixel exceeds a predetermined threshold; and assign a third score having a predetermined negative value if the difference between the value of the current pixel and the value of the adjacent pixel is below the predetermined threshold.

* * * * *